United States Patent [19]

Robson

[11] 3,895,349

[45] July 15, 1975

[54] PSEUDO-RANDOM BINARY SEQUENCE ERROR COUNTERS

[75] Inventor: Stephen Ronald Robson, Wickham Bishops, England

[73] Assignee: The Marconi Company Limited, Chelmsford, England

[22] Filed: Apr. 29, 1974

[21] Appl. No.: 464,907

[30] Foreign Application Priority Data

June 15, 1973 United Kingdom .............. 28506/73

[52] U.S. Cl. ..................340/146.1 AL; 340/146.1 AV 340/146.1 E

[51] Int. Cl.$^2$ ....................... H03K 5/18; H04B 3/46

[58] Field of Search......... 340/146.1 AL, 146.1 AV, 340/146.1 AX, 146.1 E

[56] References Cited

UNITED STATES PATENTS 3,315,228 4/1967 Futerfas et al. ............. 340/146.1 E

*Primary Examiner*—Malcolm A. Morrison
*Assistant Examiner*—R. Stephen Dildine, Jr.
*Attorney, Agent, or Firm*—Baldwin, Wight & Brown

[57] ABSTRACT

The invention relates to a pseudo-random binary sequence error counter. The error counter includes a multi-stage shift register and a logic gating circuit for comparing the signals at the outputs of predetermined stages of the shift register. The output of the first logic gating means, which during normal operation corresponds to the correct binary sequence, is compared in a second logic gating means with the incoming sequence and errors in the incoming sequence are detected and counted. Errors in the incoming signal are corrected in a further logic gating means whose output is fed into a serial input terminal of the shift register.

8 Claims, 3 Drawing Figures

PSEUDO-RANDOM BINARY SEQUENCE ERROR COUNTERS

BACKGROUND OF THE INVENTION

This invention relates to a pseudo-random binary sequence error counter.

In order to test apparatus handling binary codes, pseudo-random binary sequence generators are often used to produce a sequence resembling as closely as possible the codes present during normal operation. An example of such a generator, shown in FIG. 1 of the accompanying drawings, consists of a shift register formed by five flip-flops 10 to 14, in which the outputs of the third and fifth flip-flops 12 and 14 are connected to an exclusive-OR gate 15 of which the output is connected to the first flip-flop 10. The generated binary sequence is almost random in nature and repeats after a given number of digits depending on the construction of the generator. The properties of pseudo-random sequences are themselves well known and one of them is that binary numbers with the same number of digits occur with equal frequency, though zero is excluded. Such sequences always contain an odd number of digits and there is always one more 1 than there are 0's.

In existing test equipments, two basic methods of error detection are employed. One is generally referred to as a "code-locked loop" system, requiring a voltage controlled oscillator with analogue and digital circuitry to produce the oscillator frequency control from the auto-correlation function of the pseudo-random sequence, the oscillator driving an identical generator thus providing a second reference sequence synchronised to the incoming error signal for error detection.

One disadvantage which is encountered with the "code-locked loop" system is that the frequencies of the two pseudo-random binary sequence generators must be related as in conventional phase-locked loop systems to ensure synchronisation. However, when the difference between the frequencies of the two pseudo-random binary sequence generators is only small there is a disadvantage in that it can take a very long time for the two generators to be synchronised with one another, especially when it is remembered that in practice the shift registers can have so many stages that the generated sequences have upwards of a million bits.

An alternative known arrangement for error detection includes in its simplest form a generator as shown in FIG. 1 in which a switch is arranged between the exclusive-OR gate 15 and the first flip-flop 10 in the shift register. Initially, the switch is arranged to disconnect the exclusive-OR gate 15 from the flip-flop 10 and instead to allow to enter the flip-flop 10 the received pseudo-random sequence in which errors are to be detected. The switch is closed to complete the loop of the generator after five bits have been received and if these five bits are correct the output of the generator will be synchronised with the incoming pseudo-random sequence and can be used for error detection. If however any of the first five bits is incorrect then the pseudo-random sequence generator will still produce the same pseudo-random sequence though a different phase of the same sequence. The only possible exception to this is if the first five bits are all 0's in which case the output of the pseudo-random sequence generator will always be a 0.

BRIEF SUMMARY OF THE INVENTION

The present invention seeks to provide an error counter whose internal pseudo-random generator synchronises with the input signal even in the presence of errors by detecting an error-free section within the input signal.

In accordance with the present invention, an error counter for detecting errors in an input signal following an error-free section within a predetermined pseudo-random binary sequence includes a shift register having multiple stages, logic gating means so connected to selected locations of the shift register that after the error-free section of the predetermined pseudo-random binary sequence has been clocked into the first stage of the shift register the correct pseudo-random binary sequence thereafter occurs at the output of the logic gating means, second logic gating means for comparing the output of the first logic gating means with the input signal and producing an error signal when the compared bits differ from one another, third logic gating means responsive to the latter error signals for correcting the errors in the input signal and applying the corrected signal to the first stage of the shift register, and a latching switch connected between the second and third logic gating means and adapted to close only after a predetermined number of error-free comparisons indicating said error-free section have been effected in the second logic gating means.

Conveniently, any or all of the logic gating means may be exclusive-OR gates.

BRIEF DESCRIPTION OF THE DRAWING FIGURES

DETAILED DESCRIPTION OF THE INVENTION

Figure 1:
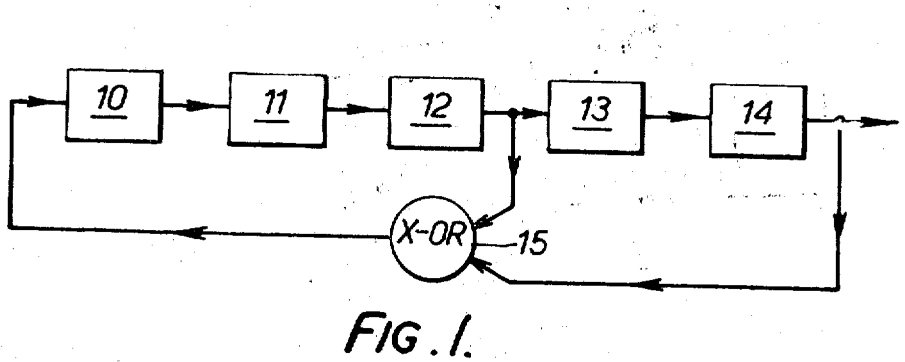
FIG. 1 is a block diagram illustrating prior art.
Figure 2:
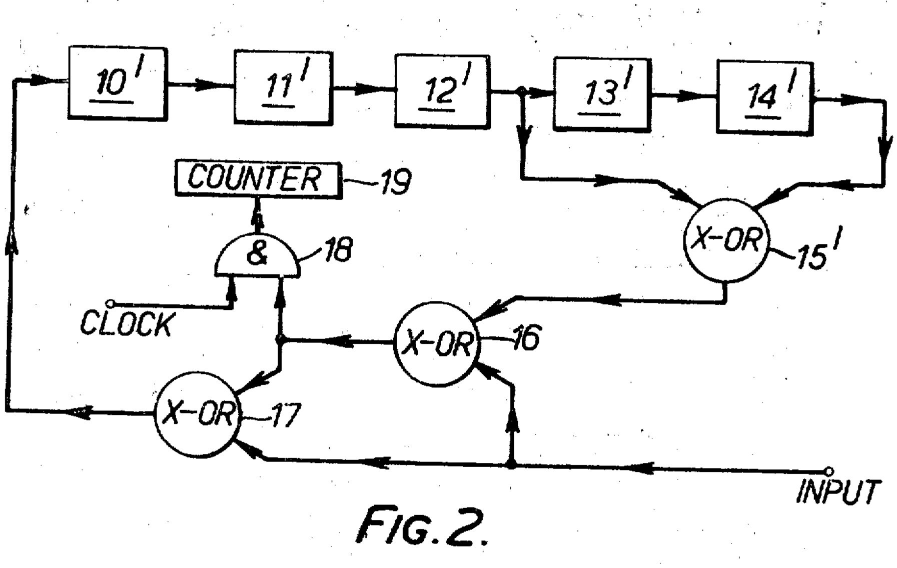
FIG. 2 is a detailed block diagram of an error counter which will be used to explain the method of operation of the invention.

Referring now to FIG. 2, an error counter includes an open-loop pseudo-random sequence generator constituted by five flip-flop 10' to 14' and an exclusive-OR gate 15'. It will be seen that this arrangement is generally similar to the five flip-flops and the exclusive-OR gate of FIG. 1 but that the output of the exclusive-OR gate is no longer fed in as an input to the first flip-flop 10' of the shift register. It is for this reason that the generator is termed "open-loop". It will be appreciated that so long as the sequence fed into the first flip-flop 10' is the same as the sequence leaving the exclusive-OR gate 15' the generator will continue working in precisely the same manner as the closed-loop generator shown in FIG. 1.

The output of the exclusive-OR gate 15' is fed as an input to a second exclusive-OR gate 16 which compares the output of the open-loop generator with the signal appearing at the line marked INPUT. Assuming that the output of the exclusive-OR gate 15' is the correct pseudo-random sequence, the output of the exclusive-OR gate 16 will only assume a level 1 whenever its input signals differ from one another, (that is to say when there is an error in the incoming sequence) and it is this signal which is gated with the clock and fed into the counter 19.

When an error has been detected, there will be a 1 level at the input to a third exclusive-OR gate 17 which acts as a corrector for the signals received over the input line. As is known, when an exclusive-OR gate has a 1 level at one of its inputs its output corresponds to the inverse of the second input. Thus, when there is an error, the input signal is inverted by the exclusive-OR gate 17 and the corrected signal is fed into the shift register.

Assuming therefore that the correct primary sequence enters the shift register 10' to 14', the output of the exclusive-OR gate 15' will also be the same binary sequence. The input signal which is brought into agreement with the output of the exclusive-OR gate 15' by means of the exclusive-OR gate 16 acting as comparator and the exclusive-OR gate 17 acting as an error corrector will then also follow the correct pseudo-random sequence and it is this sequence which is then fed into the shift register. Thus, if the sequence from the shift register is initially correct it will remain correct. If the shift register is not initially in the correct state, the arrangement of FIG. 2 cannot operate satisfactorily.

Figure 3:
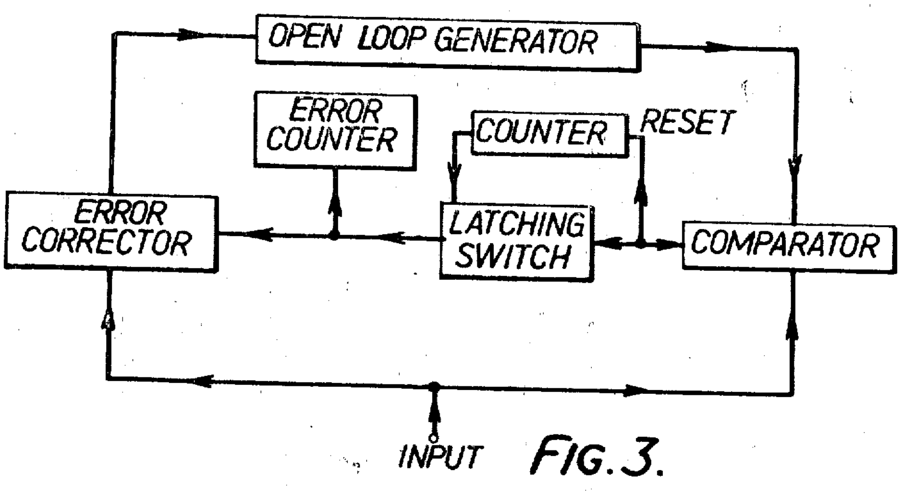
FIG. 3 is a more generalized block circuit diagram of an embodiment of the invention.

In the arrangement of FIG. 3, it will be noted that the input signal itself is used to determine the phase of the binary sequence of the open-loop generator whilst the LATCHING SWITCH is initially open. Thus error detection can occur after a predetermined number of bits of which the minimum is equal to the number of stages in the shift register.

This arrangement serves two main purposes. Firstly, it serves to preset the open-loop generator and secondly it safeguards against the possibility of errors in the input signal during synchronisation between the input signal and the loop generated sequence.

FIG. 3 is a generalized block circuit diagram of essentially the same arrangement as FIG. 2 except that the latching switch and the counter are additional elements arranged between the exclusive-OR gate 16 serving as comparator and the exclusive-OR gate 17 serving as error corrector. The counter connected to the output of the comparator is operative to count the number of error-free bit by bit comparisons and is reset upon occurrence of an error. When a predetermined count has been reached in the counter indicating that a certain number of error-free bits have been compared then the counter operates the LATCHING SWITCH whereupon the loop described in FIG. 2 is closed and the arrangement continues as previously described.

It will be appreciated that if the counter closes the switch after a count of only 50 correct comparisons, the probabilities of there being any errors in the register when the switch closes is extremely remote and would only occur if errors were present on the incoming signal in such a way as to apparently alter the phase of the incoming sequence though preserving the cyclic order of the incoming pseudo-random pattern throughout the duration of those fifty bits.

I claim:

1. An error counter for detecting errors in an input signal following an error-free section within a predetermined pseudo-random binary sequence, including a shift register having multiple stages, logic gating means so connected to selected locations of the shift register that after the error-free section of the predetermined pseudo-random binary sequence has been clocked into the first stage of the shift register the correct pseudo-random binary sequence thereafter occurs at the output of the logic gating means, second logic gating means for comparing the output of the first logic gating means with the input signal and producing an error signal when the compared bits differ from one another, third logic gating means responsive to the latter error signals for correcting the errors in the input signal and applying the corrected signal to the first stage of the shift register and a latching switch connected between the second and third logic gating means and adapted to close only after a predetermined number of error-free comparisons indicating the presence of said error-free section have been effected in the second logic gating means.

2. An error counter as claimed in claim 1, in which all of the logic gating means are exclusive-OR gates.

3. A circuit for latching on to a primary binary sequence which is an error-free section of a pseudo-random binary input signal and thereafter monitoring the pseudo-random binary input signal, said circuit comprising in combination:

a pseudo-random binary input signal terminal;

shift register means connected to said input terminal, and having a plurality of stages equal to the number of bits in said primary binary sequence, for shifting the pseudo-random binary input signal through said stages, and including first logic means connected to different stages of said shift register means for generating the correct pseudo-random binary input signal in response to the presence initially of said primary binary sequence in said stages as said pseudo-random binary input signal continues to be shifted into said shift register means;

comparator means connected to said first logic means and to said input signal terminal for producing a first signal when the output of said first logic means and the pseudo-random binary input signal are identical and for producing a second signal when the output of said first logic means and said pseudo-random binary input signal are not identical; second logic means in the connection between said input terminal and said shift register means and having an initially conditioned input for passing the pseudo-random input signal unimpeded to said shift register means; and switching means connected between the output of said comparator means and initially conditioned input of the second logic means for imposing the first and second signals from said comparator means on the initially conditioned input of said second logic means in response to a predetermined number of consecutive first signals from said comparator means whereby said second logic means passes the bits of the pseudo-random binary input signal in response to the presence of said first signal at the initially conditioned input of the second logic means and inverts incorrect bits of the pseudo-random input signal to preserve the integrity of the contents of said shift register means in response to the presence of said second signal at the initially conditioned input of the second logic means.

4. A circuit as defined in claim 3 including means for counting the occurrences of said second signal at the initially conditioned input of said second logic means.

5. A circuit as defined in claim 4 wherein said first logic means, said second logic means and said comparator means are exclusive-OR gates.

6. A circuit as defined in claim 3 wherein said first logic means, said second logic means and said comparator means are exclusive-OR gates.

7. A circuit as defined in claim 3 wherein said second logic means is an exclusive-OR gate in which the initially conditioned input is logical zero, said first signal being logical zero and said second signal being logical one.

8. A circuit as defined in claim 7 including means for counting the occurrences of said second signal at the initially conditioned input of said second logical means.

* * * * *